United States Patent
Körner et al.

(10) Patent No.: US 10,846,058 B2
(45) Date of Patent: Nov. 24, 2020

(54) METHOD AND TOOL FOR SYSTEM DEVELOPMENT

(71) Applicant: Siemens Aktiengesellschaft, Munich (DE)

(72) Inventors: Christian Körner, Bergen (DE); Reinhold Plösch, Linz (AT)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 16/371,249

(22) Filed: Apr. 1, 2019

(65) Prior Publication Data
US 2019/0317733 A1 Oct. 17, 2019

(30) Foreign Application Priority Data
Apr. 16, 2018 (EP) .................................... 18167475

(51) Int. Cl.
*G06F 8/20* (2018.01)
*G06F 8/77* (2018.01)

(52) U.S. Cl.
CPC . *G06F 8/20* (2013.01); *G06F 8/77* (2013.01)

(58) Field of Classification Search
CPC .............. G06F 8/20; G06F 8/77; G06Q 10/10
USPC ....................................................... 717/104
See application file for complete search history.

(56) References Cited

U.S. PATENT DOCUMENTS

| | | | |
|---|---|---|---|
| 2003/0074291 A1 | 4/2003 | Hartung et al. | |
| 2004/0138933 A1 | 7/2004 | Lacomb et al. | |
| 2006/0064178 A1* | 3/2006 | Butterfield | G06F 8/20 700/18 |
| 2009/0018806 A1* | 1/2009 | Butterfield | G06Q 10/0631 703/6 |
| 2012/0060144 A1* | 3/2012 | Novak | G06Q 10/06 717/105 |
| 2015/0339572 A1* | 11/2015 | Achin | G06N 5/02 706/46 |
| 2017/0322776 A1* | 11/2017 | Griessmann | G06Q 10/20 |
| 2018/0060738 A1 | 3/2018 | Achin et al. | |

FOREIGN PATENT DOCUMENTS

WO    WO 2015179778 A1    11/2015

OTHER PUBLICATIONS

Extended European Search Report dated Jul. 24, 2018 for Application No. 18167475.5.

* cited by examiner

*Primary Examiner* — John Q Chavis
(74) *Attorney, Agent, or Firm* — Schmeiser, Olsen & Watts LLP

(57) ABSTRACT

A method performed by a system development tool is provided. The method includes obtaining a system development model of a system under development, the system development model including a target model of the system and a task model, wherein the target model represents at least a set of target characteristics of the system, and wherein the task model represents a set of tasks. The task model associates at least one task characteristic to each task of the task model. The method also includes evaluating the system development model based on a quality model, the quality model providing a set of quantitative criteria for evaluating the system development model; as well as indicating an evaluation result.

9 Claims, 3 Drawing Sheets

METHOD AND TOOL FOR SYSTEM DEVELOPMENT

CROSS-REFERENCE TO RELATED APPLICATIONS

This application claims priority to European Application No. 18167475.5, having a filing date of Apr. 16, 2018, the entire contents of which are hereby incorporated by reference.

FIELD OF TECHNOLOGY

The following concerns the field of system development.

BACKGROUND

For development of complicated systems, e.g. physical systems like industrial plants, and/or software, different approaches may be utilized. In many cases, a project development plan is provided, which may be based on a task model. In a task model, actions or development steps to be performed for developing the system may be represented as tasks. In addition to a task model, a target model of the system, as it is supposed to be used, is to be provided. The target model represents desired system characteristics. Target model and task model have to be supported by the system to be developed. For complex systems, the models may cover different domains and may require cooperation of multiple experts. Problems with project development plans usually become apparent during implementing the plan, or when desired system characteristics are not achieved. Also, project development plans tend to comprise a larger number of tasks than necessary to achieve the desired system characteristics.

SUMMARY

It is a goal of embodiments of the present invention to provide more objective and reliable approaches for system development, to overcome problems of development projects discussed herein. The embodiments suggest using a quality model for evaluating a system development model, for example for iteratively adapting or improving a system development model.

Accordingly, there is described a method performed by a system development tool. The method comprises obtaining a system development model of a system under development, the system development model comprising a target model of the system and a task model. The target model represents at least a set of target characteristics of the system, and the task model represents a set of tasks, e.g. tasks of the system, and/or tasks to be performed by the developed system and/or to be performed for developing the system. The task model associates at least one task characteristic to each task of the task model. The method further comprises evaluating the system development model based on a quality model, the quality model providing a set of quantitative criteria for evaluating the system development model, in particular for evaluating the task model in relation to the target model. The method also comprises indicating an evaluation result, which may be based on, and/or represent the result of the evaluating action. Based on embodiments of the invention, quicker and more reliable evaluation of a system development model is possible, in particular automatable. Early detection of possible problems, e.g. before a system development model and/or task model is implemented, is facilitated.

The method may comprise adapting the system development model based on the evaluation result. Thus, feedback from the evaluation can be used to improve the system development model. The method may comprise iteratively developing a system development model by repeating steps of evaluating and adapting the model. Alternatively, or additionally, the method may comprise comparing different system development models based on their respective evaluation results.

It may be considered that the set of target characteristics comprises one or more physical parameters of the system, which may for example be represented by associated target characteristics. The system may in particular be a physical system like a factory or energy plant or generator. However, characteristics of a software, e.g. regarding a user interface and/or latency and/or memory requirement, may be considered as examples of physical parameters as well.

The system development model may be based on an existing and/or developed system. An existing system may be a system that has been built or constructed, whereas a developed system may be a system for which a system development model has been provided, but not yet been implemented for construction. Thus, further development may be provided, e.g. with changing requirements or interests, and/or for a new business idea or concept.

Evaluating the system development model may comprise identifying errors in the system development model. Such errors may be indicated as part of the result. An error may for example be based on inconsistencies between characteristics, in particular between one or more target characteristics and one or more task characteristics.

In general, evaluating the system development model may comprise an analysis, like a semantic and/or syntactic and/or contextual analysis, of the task model in relation to the target model. The analysis may be associated to the quality model, e.g. be encompassed therein. In particular, an analysis may compare target characteristics and task characteristics. The analysis in general may be automated and/or performed by a suitable software. It may be considered that an analysis comprises word matching and/or word counting. The task model and/or target model may generally comprise words and/or parameters and numbers. The analysis may facilitate easy handling of such models, in particular to determine whether the terminology used for different parts of the models is consistent.

The set of tasks and/or the task model may comprise a plurality of subsets of tasks. Generally, the task model may have several layers of abstraction. Adapting the system development model may comprise changing the abstraction layers, and/or adding or removing one or more layers. For different systems, different approaches to abstraction may be suitable. To each abstraction layer, one or more sets or subsets of task may be association. A set or subset of tasks may in general comprise one or more tasks. In particular on the highest abstraction layer, the set may comprise one task, which may be split up in subtasks in one or more subsets or abstraction layers. Tasks and/or subtask may be serial or parallel to other task or subtask, depending on the system to be developed.

At least one task characteristic may comprise one or more task goals. A task goal may represent a deliverable of the task, e.g. an action performed and/or value provided. The action may be performed to a specified parametrisation or range. A task may generally be an action to be performed according to the system development model, in particular the task model.

It may be considered that the quality model provides rules and/or measurements to evaluate the system development model. An analysis as described herein may be based on such rules and/or measurements. Such rules and/or measurements facilitate quantified evaluation of the system development model, and/or the task model and/or the target model, and/or the task model in relation to the target model.

In general, the system development model may pertain to multiple system domains. System domains may in particular refer to a field of technology involved in the system, e.g. electronics and/or construction and/or software and/or electrics and/or radio technology. The approaches described herein in particular allow improved system development of system touching on multiple such domains. It should be noted that for modelling in such different domains, usually different terminology is employed. This may even occur regarding the same domain, e.g. in comparison between the target model and the task model, which may be seen from different perspectives by their respective modellers or stakeholders.

There is also considered a system development tool, the system development tool being adapted for carrying out a method as described herein. The tool may comprise software and/or hardware and/or firmware. It may be considered that the tool comprises individual tools for performed actions of the method, e.g. an evaluation module and/or obtaining module and/or indicating module and/or adapting module. A module generally may be implemented in software. Alternatively, or additionally, it may be considered that the tool comprises and/or utilises integrated circuitry, in particular processing circuitry, for performing actions of the method. Integrated circuitry or processing circuity may comprise one or more processors, e.g. microprocessor/s, and/or FPGAs (Field Programmable Gate Array) and/or ASICs (Application Specific Integrated Circuitry) and/or microcontrollers. The circuitry may comprise, and/or be connected or connectable to, memory, e.g. transient and/or volatile and/or non-volatile memory. Examples of memory comprise RAM (Random Access Memory), ROM (Read-Only Memory), cache memory, buffer memory, optical memory or magnetic memory. The tool may be centralised or distributed, e.g. with different functionalities associated to different modules or units, e.g. communicating via suitable interfaces like communication interfaces or software interfaces.

The method may especially be carried out, completely or in part, by a computer system. To this end, the method may be formulated as a computer program product (non-transitory computer readable storage medium having instructions, which when executed by a processor, perform actions) with program code means. The above described system or tool may comprise the computer system. Advantages or features of the method may apply to tool or system and vice versa.

BRIEF DESCRIPTION

Some of the embodiments will be described in detail, with references to the following Figures, wherein like designations denote like members, wherein.

DETAILED DESCRIPTION

Figure 1:
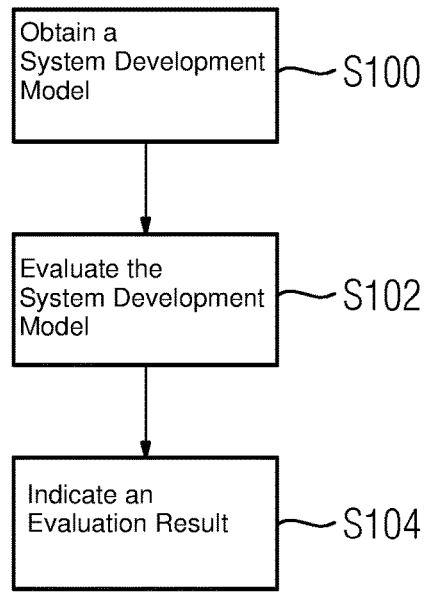
FIG. 1 shows an exemplary flow diagram of an inventive method.

FIG. 1 shows an exemplary flow diagram of an inventive method. In an action S100, a system development tool obtains a system development model. Obtaining may in general comprise any combination of actions and/or sources for obtaining information representing the obtained model, e.g. receiving from input like user input or from a program, reading from memory or storage, receiving via an interface, determining relevant parameters, etc. Obtaining may comprise interaction with one source or multiple sources, e.g. multiple input devices and/or users. In some cases, obtaining may comprise accessing stored data, e.g. in a database or file, for obtaining part of the system development model. In an action S102, the system development tool may evaluate the system development model based on a quality model. Evaluating may in particular comprise comparing task characteristics and target characteristics. Evaluating may in general comprise measuring, and/or evaluation of rules, and/or factoring, and/or aggregation, and/or detecting error and/or possible improvement, and/or prioritising and/or sorting of evaluation results. In an action S104, the system development tool may indicate the evaluation result. Indicating may generally comprise providing data and/or signalling as output. For this purpose, the tool may be connected or connectable, or comprise, one or more indication devices, e.g. an output interface and/or user interface and/or display and/or printer and/or memory device, e.g. magnetic memory or optical memory. Indicating may comprise feeding back the result to a system development, e.g. for adapting the system development model. Units, modules or interfaces associated to one of the actions herein also be adapted to perform one or more of the other actions. For example, an evaluation unit or module may comprise an obtaining module and/or indicating module. A module may generally comprise one or more submodules, which may be co-located or distributed.

Figure 2:
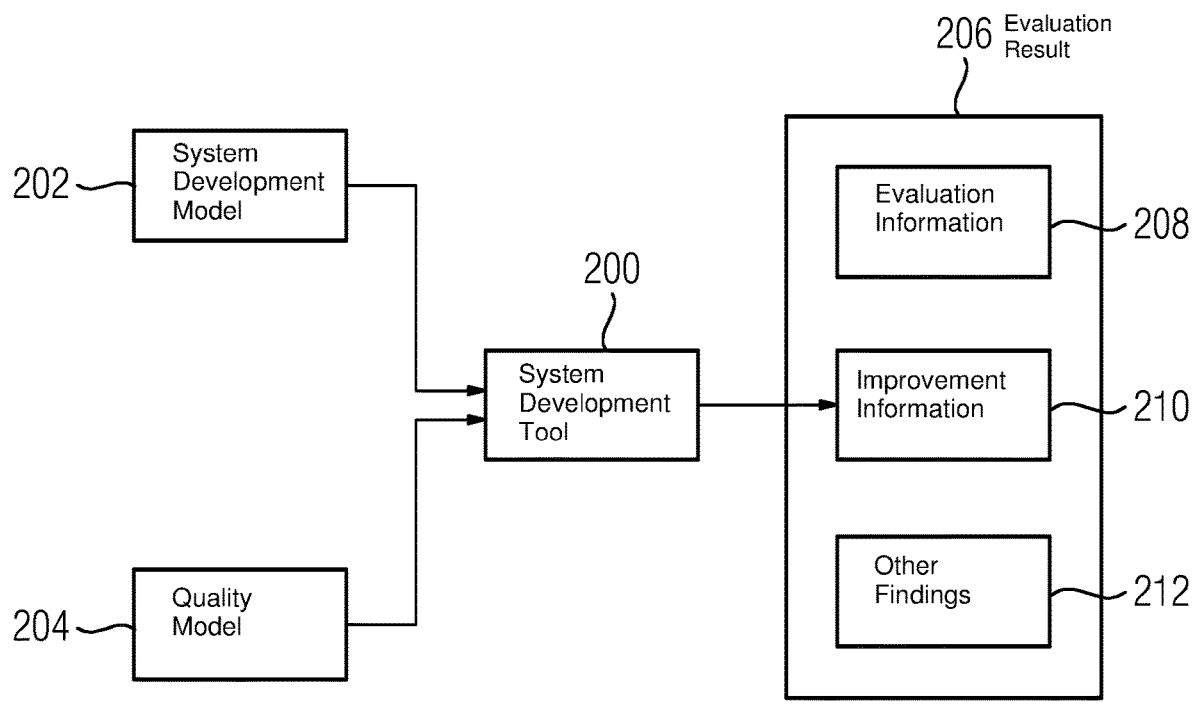
FIG. 2 shows an exemplary inventive system development tool.

FIG. 2 shows an exemplary system development tool 200. The tool 200 may obtain, e.g. receive as input, the system development model 202 and the quality model 204. It may indicate, e.g. provide as output, the evaluation result 206. The result 206 may for example comprise evaluation information 208, e.g. based on measurement and/or rules, and/or improvement information 210, e.g. proposals to improve the system development model, and/or other findings 212, for example comparison with an earlier evaluation and/or another system development model, which may be alternative and/or from an earlier iteration.

Figure 3:
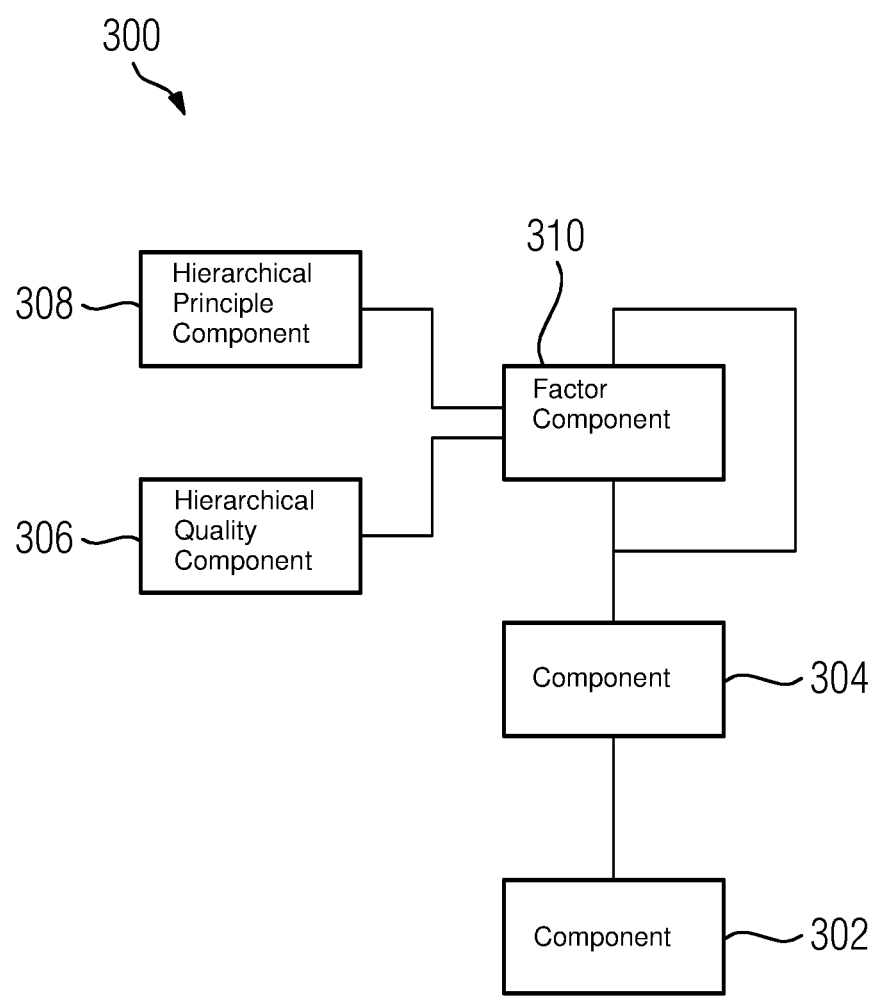
FIG. 3 shows an exemplary quality model used with embodiments of the invention.

FIG. 3 shows an exemplary quality model structure 300. It should be noted that a quality model 300 in general may comprise one or more quantitative criteria, and/or associated rules for which a test may be performed whether, and/or to which degree, they are followed or not. Generally, the quality model 300 may comprise quantitative criteria for evaluating a system development model. The quality model 300 may comprise different components, which may represent quantification rules and/or associated information usable for evaluating a system development model. To each component, there may be associated a corresponding module, or multiple submodules. A component 302 of the quality model 300 may pertain to measuring to be performed for evaluating, e.g. indicating one or more measures. A measure may pertain to a rule or characteristics of one of the other components. In particular, for each rule or characteristic, there may be an associated measure. A measure may generally indicate how data is determined based on, and/or extracted from, the system development model to evaluated. Another component 304 of the quality model may pertain to one or more rules. A rule may represent context, and/or a relation or set of relations, of characteristics of the system development model. It may be considered that a rule facilitates detection of errors and/or issues with the system development model, e.g. inconsistencies between target characteristics and task characteristics, and/or unnecessary characteristics, or characteristics not related to a context of the system development model. Whether a rule is followed, may be determined based on a set of measurements, wherein a set of measurements may generally comprise one or more measurements. The quality model may comprise a hierarchical quality component 306, which may indicate quality characteristics of a system development model, e.g. associated to one or more of the other components. It may be considered that the quality model 300 comprises a hierarchical principle component 308, which may indicate principles of construction of system development models, e.g. pertaining to format and/or structure. The quality model 300 may comprise a factor component 310, which may pertain to a hierarchical representation of rules and/or criteria. This component 310 may for example prioritise and/or contextualise and/or aggregate issues arising within other components. In some cases, the factor component 310 may weigh information from other components, e.g. to account for one characteristic being particular important in specific contexts and/or if a specific issue arises. The factor component 310 may in particular indicate how and/or which rules and/or principles are implemented. Each of the components is optional. In general, a component may be considered to represent rules and/or quantitative criteria for different aspects of the system development model. Evaluation may comprise, and/or be based on, measuring, and may comprise determining whether a measurement result is good or bad. Such evaluating may be based on a rule and/or principle and/or quality. Evaluating may for example comprise comparing a measurement with one or more associated thresholds. Improvements may be indicated based on the quality model, which may for example be prioritised and/or sorted based on quality criteria, in particular on aggregated and/or factorised information provided when evaluation is based on the quality model. Examples of rules of the quality model comprise rules pertaining to the number of tasks, and/or sets or groups of tasks, and/or of target characteristics and/or sets or groups thereof, the number of abstraction layers of the model, e.g. task model and/or target model, and/or relations or difference between such, in particular between target model and task model. Other rules may be associated to the mapping between task model and target model, e.g. associated characteristics, and/or to a context of the system development model. Rules may pertain to integrity and/or consistency of the system development model. Some example rules may pertain to the context of the system development model, e.g. whether is complete or closed, or over-specifies, e.g. specifies characteristics that are not needed for the context.

Figure 4:
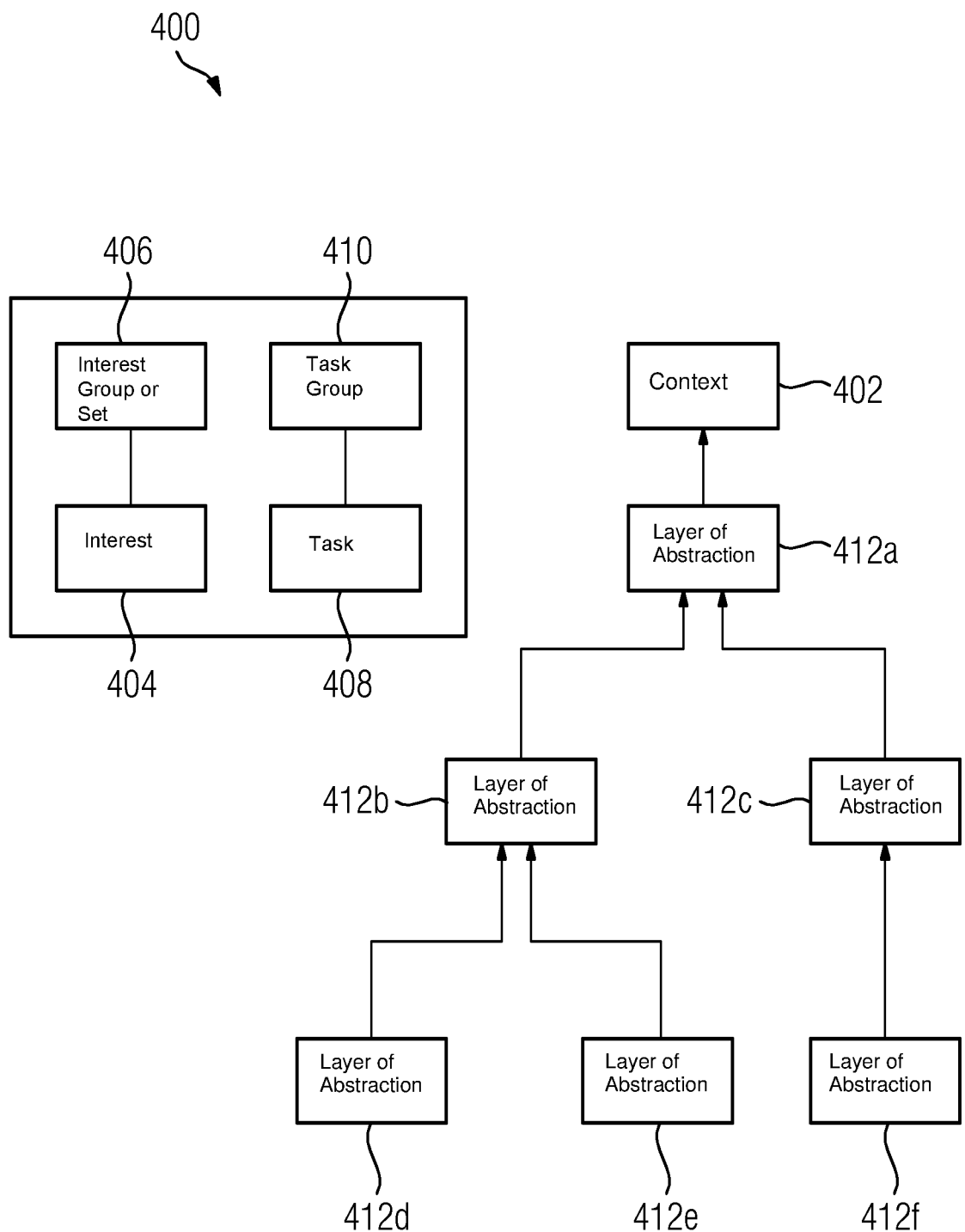
FIG. 4 shows an exemplary system model used with embodiments of the invention.

FIG. 4 shows an exemplary system development model 400, which in particular may be considered a form of domain model, and/or may comprise such. The model 400 may represent a context 402, for example a business idea or implementation requirement or target. The target characteristics of the model may be represented by interests 404, which may be grouped into one or more interest groups or sets 406, representing a set of target characteristics. Target characteristics may represent characteristics of the system to be developed, e.g. pertaining to performance and/or user requirements, and/or economic and/or ecological and/or legal requirements, and/or other characteristics, in particular physical characteristics. The system development model 400 may comprise a task model, which may comprise tasks 408 that may be grouped in task groups 410 and/or one or more sets of tasks. To each task 408, at least one task characteristic may be associated, in particular a task goal. A task 408 may generally indicate a task or subtask to be performed to develop the system to be developed, which may be considered represented by the target model. The task model may be a hierarchical task model, e.g. according to a Hierarchical Task Analysis (HTA). The target model and the task model may be considered components of the system development model. The system development model 400 may be adapted, e.g. based on the evaluation result.

The system development model may generally comprise multiple layers of abstraction 412a-f, e.g. for the target model representing the target characteristics, and/or the task model. Different numbers of layers may be used for different parts of the system development model. The system development model may comprise additional components in addition to the task model and target model.

It may be considered that a characteristic of the model 400, e.g. a task characteristic and/or a target characteristic, is associated or associable to the context. In particular, it may be considered that a quality model 300 comprises a rule evaluating such association and/or considering that as criteria for quality of the system development model 400 or domain model. A rule may be considered that evaluates if a characteristic is indirectly and/or directly associated or associable to the context or not; if not, an improvement may suggest dropping the characteristic from the model, or to provide an association. There may be considered a rule that pertains to whether a given task characteristic or task is associated or associable to a target characteristic; if not, an improvement proposal may be to drop the associated task or task goal, or to provide an association.

The approaches described herein facilitate automated and reliable evaluation of system development models, in particular before they are implemented to develop a system. However, the approaches may also be implemented during development of the system, e.g. for monitoring, quality control and/or easy adaption to changes e.g. in the task model or target model, which may occur during changes in requirements or conditions, e.g. represented as interests.

A quantified approach described herein allows formalised handling of information and experience related to system development and systems. The information may be structured; in particular, the level or quality of structure may be increased iteratively, or over multiple system developed. Possible error sources or issues may be identified and separated, prioritization of issues and/or improvements may be considered. Performing the method iteratively may comprise, and/or be based on, ongoing input relating to the system development process, e.g. when monitoring the development. Finetuning of the system development model, in particular the task model and/or target model, is facilitated, as model parts that may need larger resolution, e.g. in terms of layers of abstraction, can be identified. Also, parts that can be modelled with less abstraction may be identified. The embodiments allow validation of the quality model and its coverage and may comprise an action of adapting the quality model, e.g. based on the evaluation result and/or feedback from the system development process.

According to embodiments of the invention, system development efficiency may be significantly improved, with improved reliability and validation being facilitated.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A method performed by a system development tool, the method comprising:

obtaining a system development model of a physical system under development, the physical system development model comprising a target model of the physical system and a task model, wherein the target model represents at least a set of target characteristics of the physical system, the set of target characteristics comprising one or more physical parameters of the physical system, and wherein the task model represents a set of tasks, and wherein the task model associates at least one task characteristic to each task of the task model, wherein the system development model pertains to multiple system domains, each system domain of the multiple system domains referring to a field of technology involved with the physical system;

evaluating the system development model based on a quality model, the quality model providing a set of quantitative criteria for evaluating the system development model; and indicating an evaluation result.

2. The method according to claim 1, wherein the method comprises adapting the system development model based on the evaluation result.

3. The method according to claim 1, wherein the system development model is based on at least one of an existing and developed physical system.

4. The method according to claim 1, wherein evaluating the system development model comprises identifying errors in the system development model.

5. The method according to claim 1, wherein evaluating the system development model comprises at least one of semantic, syntactic and contextual analysis of the task model in relation to the target model.

6. The method according to claim 1, wherein the set of tasks comprises a plurality of subsets of tasks.

7. The method according to claim 1, wherein the at least one task characteristic comprises one or more task goals.

8. The method according to claim 1, wherein the quality model provides at least one of rules and measurements to evaluate the system development model.

9. A system development tool, the system development tool being adapted for carrying out the method according to claim 1.

* * * * *